United States Patent
Breau et al.

(10) Patent No.: US 8,305,963 B1
(45) Date of Patent: Nov. 6, 2012

(54) FEMTO CELL LOCAL BREAKOUT WITH PPP PROXY

(75) Inventors: Jeremy R. Breau, Kansas City, MO (US); Daesik Oh, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 616 days.

(21) Appl. No.: 12/536,648

(22) Filed: Aug. 6, 2009

(51) Int. Cl.
*H04W 40/02* (2009.01)

(52) U.S. Cl. .......................................... 370/328; 370/329

(58) Field of Classification Search ........... 370/328–329
See application file for complete search history.

(56) References Cited

U.S. PATENT DOCUMENTS

| | | | |
|---|---|---|---|
| 2003/0217110 A1* | 11/2003 | Weiss | 709/207 |
| 2009/0268668 A1* | 10/2009 | Tinnakornsrisuphap et al. | 370/328 |
| 2010/0020753 A1* | 1/2010 | Fulknier et al. | 370/329 |
| 2011/0038318 A1* | 2/2011 | Parsons et al. | 370/328 |

* cited by examiner

*Primary Examiner* — Sulaiman Nooristany

(57) ABSTRACT

Methods are provided for facilitating local communication between wireless devices at a femto cell without passing communication to a network infrastructure, routing data packets to devices connected to a femto cell, and eliminating a need to send data to a home agent when two devices are connected to the same femto cell. When mobile devices are in a femto cell zone, it is not necessary to send payload information to a core network including a packet data serving node and a home agent. A femto cell local breakout with a PPP proxy can be used to handle the payload information locally. The femto cell local breakout with PPP proxy stores the mobile devices and IP addresses. So, when one mobile device in the femto cell zone sends payload information to another mobile device, the femto cell routes the payload information to the other mobile device in the femto cell zone.

11 Claims, 5 Drawing Sheets

FEMTO CELL LOCAL BREAKOUT WITH PPP PROXY

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a method for facilitating local communications between wireless devices at a femto cell without passing communication to a network infrastructure is provided that includes receiving a request for a data session at the femto cell from a first mobile device. The request includes a source internet protocol (IP) address associated with the first mobile device and a destination IP address associated with a second mobile device. A first point-to-point protocol (PPP) tunnel is created between the femto cell and the first mobile device. The request is analyzed to capture the destination IP address. A mapping table is analyzed in the femto cell to determine if the destination IP address is in the mapping table. If the destination IP address is in the mapping table, a second PPP tunnel is created between the femto cell and the second mobile device and the data session is routed between the first mobile device and the second mobile device using the first PPP tunnel and the second PPP tunnel without passing the data session to the network infrastructure. The network infrastructure includes at least a home agent or a packet data serving node (PDSN). If the destination IP address is not in the mapping table, an outbound PPP tunnel is created between the femto cell and the network infrastructure. The data session may be routed to the second mobile device located elsewhere in the network infrastructure or may be routed from the first mobile device to the network infrastructure and then back through the femto cell to the second mobile device.

In a second aspect, a method for routing data packets to devices connected to a femto cell is provided that includes receiving a data packet in a data session into a femto cell from a source mobile device. A target mobile device is determined that is connected to the femto cell. The data packet is routed to the target mobile device without sending the data packet to a home agent or a packet data serving node (PDSN).

In a third aspect, a method for eliminating a need to send a data session to a home agent when two devices are connected to the same femto cell are provided that includes parsing messages that pass through the femto cell from mobile devices and the home agent. A mapping table is built that contains information about the mobile devices that are connected to the femto cell. The mapping table is built by adding an internet protocol (IP) address and a point-to-point protocol (PPP) tunnel information of a mobile device to the mapping table. A packet is received from a first mobile device destined for a second mobile device. The packet includes a source IP address of the first mobile device, a target IP address of the second mobile device, and a first payload. At least the target IP address and the first payload are encapsulated into a first PPP that exists between the first mobile device and the femto cell. A check is made for the target IP address in the packet from the first mobile device. A determination is made that the target IP address is found in the mapping table, which indicates the second mobile device is connected to the femto cell. At least the target IP address and the first payload are encapsulated into a second PPP that exists between the second mobile device and the femto cell. Either the target IP address, the first payload, or both are delivered to the second mobile device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
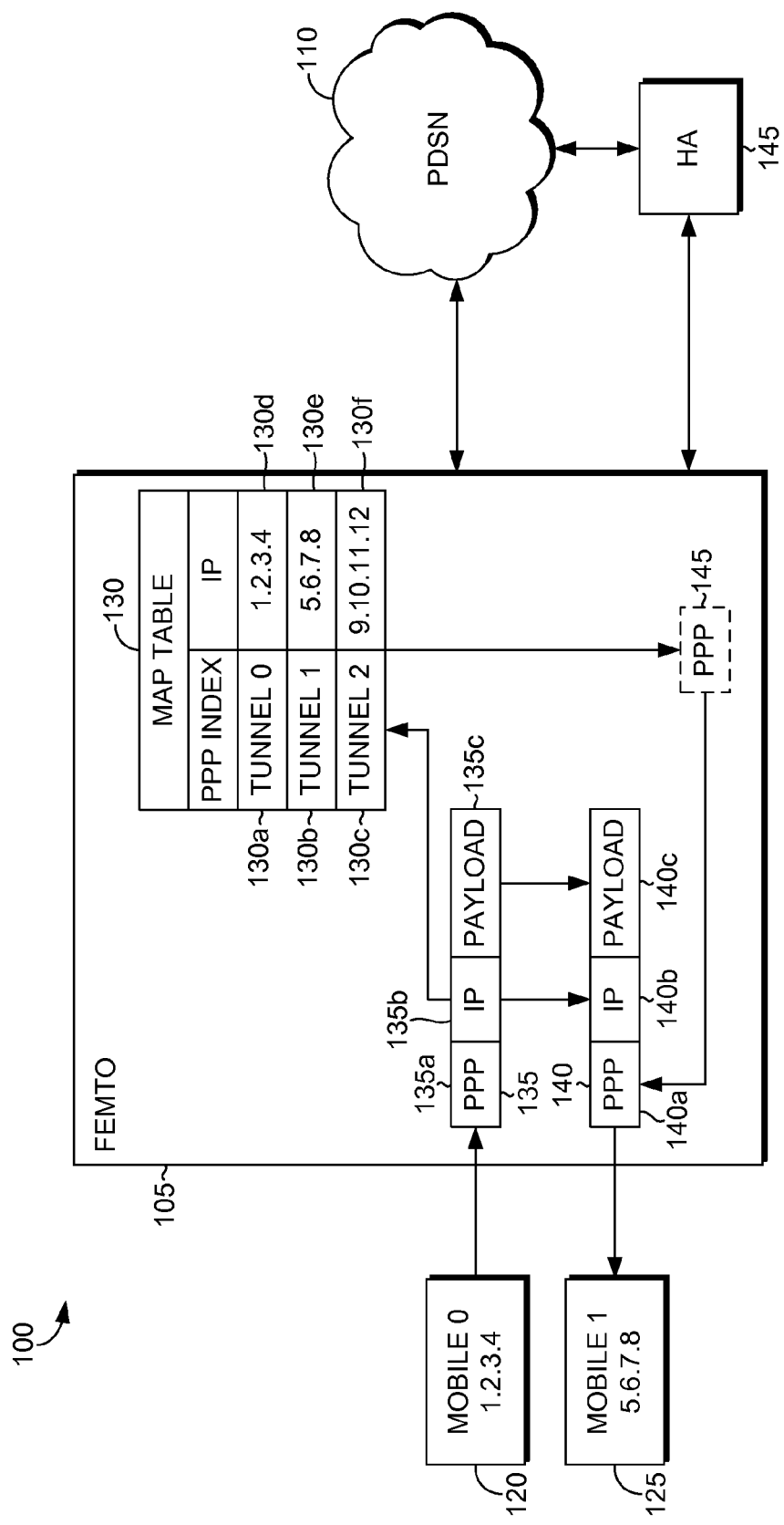
FIG. 1 illustrates a block diagram of a femto cell with local PPP routing functionality implemented in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD-ROM | Compact Disc-Read-Only Memory |
| DSL | Digitial Subscriber Line |
| DVD | Digital Versatile Discs |
| EEPROM | Electronically Erasable Programmable Read-Only Memory |
| HA | Home Agent |
| IP | Internet Protocol |
| PDA | Personal Digital Assistant or Personal Data Assistant |
| PDSN | Packet Data Serving Node |
| PPP | Point-to-Point Protocol |
| PSTN | Public Switched Telephone Network |
| RAM | Random Access Memory |
| ROM | Read-Only Memory |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Femto Cell Local Breakout with Point-to-Point Protocol (PPP)

Implementations of embodiments of the present invention provide femto cells with local PPP routing functionality. A femto cell is a local wireless base station that monitors communications of locally served clients such as mobile devices. The femto cell dynamically generates mapping data that correlates each client's internet protocol (IP) address with a PPP tunnel that the client has with a downstream PPP server such as a packet data serving node (PDSN) or other network access server. The femto cell detects communication from the IP address of the locally connected client to the IP address of another locally connected client. Ordinarily, this communication would pass through to the downstream PPP server. However, in implementations of embodiments of the present invention, the femto cell strips from the communication an outbound PPP header and adds in its place a PPP header for a destination client's PPP tunnel. Then, the communication is routed locally to the destination client. Thus, the femto cell facilitates communication between wireless devices without passing the communication to the network infrastructure and without the need for any modification to the served client devices. In the embodiments, the client devices are unaware that routing has been changed.

To illustrate the information described above, FIG. 1 describes a femto cell with local PPP routing functionality in a network 100. In network 100, a femto cell 105 is connected to a packet data serving node (PDSN) 110 and a home agent (HA) 115. Femto cell 105 is also connected to mobile devices 120 and 125. FIG. 1 is a partial view of a network that typically includes more devices than those shown in network 100. For example, PDSN 110 and HA 115 usually connect to other devices in a service provider network in order to facilitate communications between mobile devices 120 and 125 with other devices or destinations. For example PDSN 110 and HA 115 may be connected to an IP core network, the public switch telephone network (PSTN), or the internet. PSDN 110 and HA 115 may be connected to devices that are placed between femto cell 105 and PSDN 110 or between femto cell 105 and HA 115. For example, although not shown, a femto network gateway can exist between femto cell 105 and PSDN 110.

Typically, femto cell 105 resides in a residence or business and is used to facilitate communications where a standard base station is not available or where there is no wireless coverage from the service provider. To facilitate the communications, femto cell 105 connects mobile devices 120 and 125 providing access to broadband services and wireless services. It is noted that although network 100 shows mobile devices 120 and 125 connected to femto cell 105, additional mobile devices or clients may be connected to femto cell 105. In addition, the types of mobile devices may vary including such devices as, but not limited to, mobile phones, personal digital assistants, wireless media players, laptops, and other computing devices.

Continuing with FIG. 1, femto cell 105 includes a mapping table 130 that associates IP addresses of mobile devices connected to femto cell 105 to their respective PPP tunnel. For example, in femto cell 105, an exemplary set of entries are shown in mapping table 130. The set of entries include PPP tunnels 130$a$, 130$b$, and 130 $c$ along with IP addresses 130$d$, 130$e$, and 130$f$. Typically, mapping table 130 is dynamic and its size shall vary as entries are added and deleted based on the connections made to femto cell 105. As shown, mobile device 120 is connected to femto cell 105, and its entry is identified in mapping table 130 as PPP tunnel 130$a$ and IP address 130$d$. Mobile device 125 is connected to femto cell 105, and its entry is identified in mapping table 130 as PPP tunnel 130$b$ and IP address 130$e$. PPP tunnel 130$c$ and IP address 130$f$ are not shown with a corresponding device for illustrative purposes. PPP tunnel 130$c$ and IP address 130$f$ are shown to illustrate the dynamic capability of mapping table 130 to handle various entries. However, in an implementation of an embodiment of the present invention, PPP tunnel 130$c$ and IP address 130$f$ could correlate to a mobile device that has recently disconnected from femto cell 105. In such circumstances, femto cell 105 will eventually remove PPP tunnel 130$c$ and IP address 130$f$ from mapping table 130.

When mobile devices 120 and 125 connect to femto cell 105, data packets will flow between mobile device 120 or 125 and femto cell 105. In network 100, illustrative data packets 135 and 140 are shown which are indicative of many data packets that flow in and out of femto cell 105. Data packet 135 is associated with mobile device 120 and shows a PPP 135$a$, an IP 135$b$, and a payload 135$c$. Data packet 140 is associated with mobile device 125 and shows a PPP 140$a$, an IP 140$b$, and a payload 140$c$. Data packets 135 and 140 are not illustrated to be an exact replica of the actual data that flows, but are illustrated to show the kinds of information that are involved in the implementation of embodiments of the present invention. For example, PPP 135$a$ is the proxy that binds mobile device 120 into a communication with femto cell 105. PPP 135$a$ encapsulates data packets so that this communication can occur between mobile device 120 and femto cell 105. In this encapsulation, IP 135$b$ and payload 135$c$ are delivered from mobile device 120 to femto cell 105. Femto cell 105 then uses another PPP to send IP 135$b$ and payload 135$c$ to a destination.

The connection of mobile device 120 to femto cell 105 is shown further in mapping table 130. As one can see, mobile device 120 has an IP address of 1.2.3.4. This same IP address is shown in mapping table 130 as IP address 130$d$. PPP 135$a$ correlates to PPP tunnel 130$a$. For illustrative purposes, IP address 130$d$ can be thought of as a source IP address since mobile device 120 is used as the starting point for a communication activity. Likewise, mobile device 125 has an IP address of 5.6.7.8. This same IP address is shown in mapping table 130 as IP address 130$e$. PPP 140$a$ correlates to PPP tunnel 130$b$, but only after some interworking activity by femto cell 105. IP address 130$e$ can be thought of as a destination IP address or target IP address since mobile device 125 is used as the terminating point for communication activity.

In an implementation of an embodiment of the present invention, a connection to femto cell 105 occurs with a binding of PPP proxies to connect femto cell 105 with each device that connects to it. In network 100, PPP 135*a* connects mobile device 120 with femto cell 105 and PPP 140*a* connects mobile device 125 with femto cell 105. This binding of the PPP proxy can occur when a user turns on one of the mobile devices and those mobile devices are in proximity to femto cell 105. It is noted that each mobile device that connects to femto cell 105 has it own PPP proxy. Each connection of the mobile devices to femto cell 105 prepares the mobile devices for communication sessions with the network infrastructure. The network infrastructure is the greater network beyond femto cell 105, which includes PDSN 110, HA 115, the IP core network, service provider network, the internet, and beyond. The attempt here is to not to quantify the network infrastructure but only indicate that mobile devices 120 and 125 communicate with other devices beyond femto cell 105.

When PPP proxies are established for the binding of mobile devices 120 and 125 with femto cell 105, the communication sessions are prepared to route data packets to PDSN 110 or HA 115. However, in implementations of embodiments of the present invention, femto cell 105 initiates a new PPP proxy identified as a PPP 145 and replaces PPP 140*a*. In this way, when data packets come into femto cell 105 from mobile device 120 destined for mobile device 125, those data packets are re-routed within femto cell 105 directly back to mobile device 125 without going to PDSN 110, HA 115, or both. PPP 145 replaces and becomes PPP 140*a*. This is the reason that PPP 140*a* correlates to PPP tunnel 130*b*, but only after some interworking activity by femto cell 105 has occurred. As long as an entry of a mobile device can be found in mapping table 130, femto cell 105 can bind a new PPP proxy (PPP 145) to re-route data within femto cell 105 without sending data to PDSN 110 or HA 115 and then back down to the terminating mobile device. However, if the targeted mobile device is not found in mapping table 130, then, femto cell 105 creates an outbound PPP proxy (not shown) and sends the data packets to PDSN 110 and HA 115 to be routed to the destination device.

Figure 2:
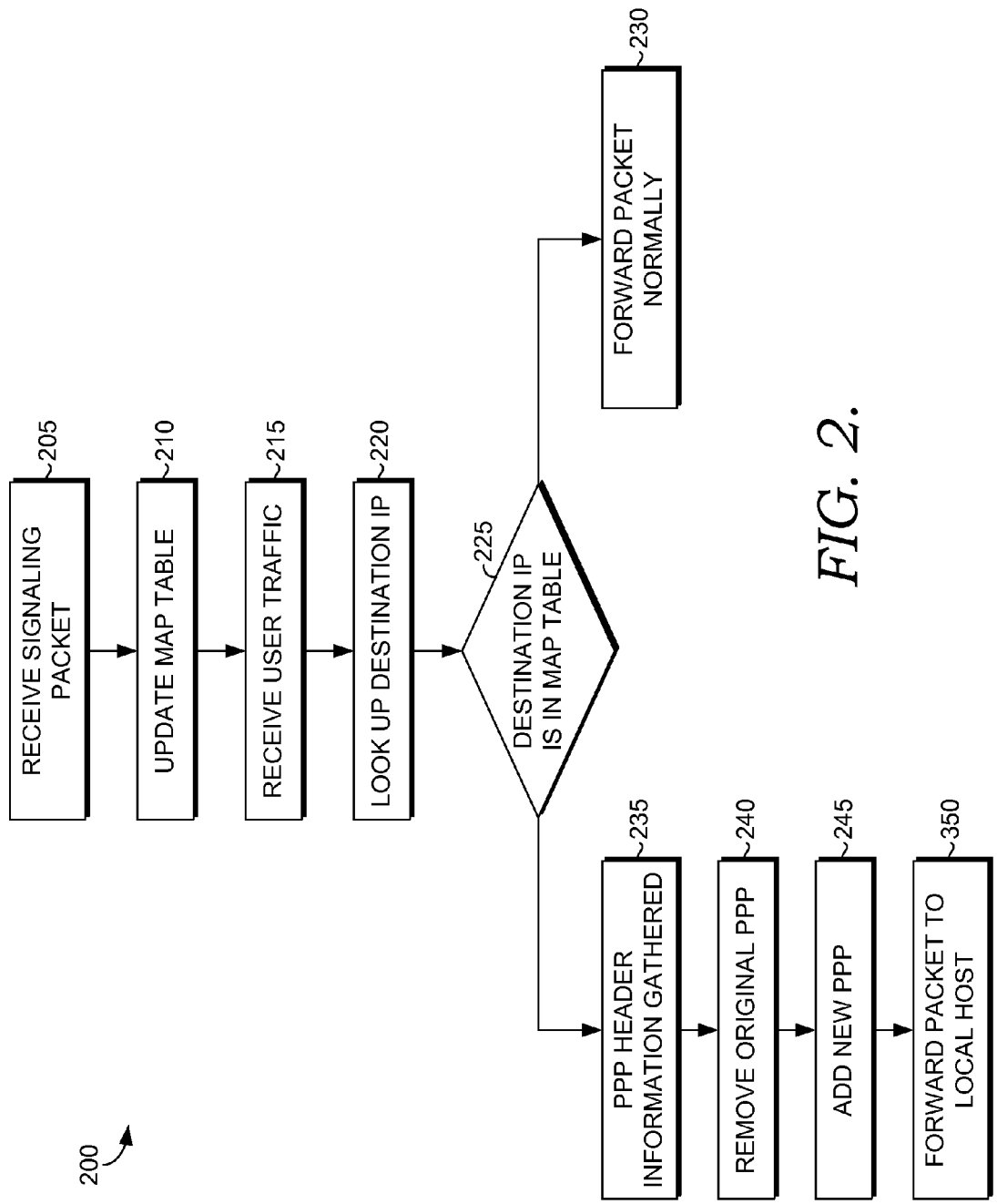
FIG. 2 illustrates a process for using PPP proxies for a local breakout in a femto cell implemented in accordance with an embodiment of the present invention.

Turning now to FIG. 2, a process for using PPP proxies for a local breakout in a femto cell is shown in a method 200. In a step 205, signaling packets are received by femto cell 105. These signaling packets can come from a variety of places but typically come from mobile devices connected to femto cell 105 or from PDSN 110 or HA 115. The signaling packets include PPP and IP address information that enables mapping table 130 to be build or update as shown in a step 210. As discussed above, signaling packets may be received when a mobile device initially turns on and establishes a connection with femto cell 105. Although a user of the mobile device may not attempt to use the mobile device for any purpose, signaling packets are sent to femto cell 105 to establish a connection. In some cases, the signaling packets are sent to PDSN 110 and HA 115, and their resulting signaling packets are received at femto cell 105 providing information about the mobile device that desires to connect to femto cell 105.

In a step 215, a user attempts to connect with another device generating user traffic. The user may want to access the internet, send photographs to another person, or make a voice telephone call. The user can make a voice call with the mobile device but part of this call will traverse the packet network using voice over internet protocol (VoIP) as femto cell 105 typically connects to a broadband network. In a step 220, femto cell 105 looks up the destination IP address that the user desires to reach. Femto cell 105 attempts to determine if the destination IP address is located in mapping table 130, as shown in a step 225. In a step 230, if the destination IP address is not found in mapping table 130, data packets are routed normally to PDSN 110 and HA 115. In a step 235, if the destination IP address is found in mapping table 130, it indicates that the device associated with the destination IP address is connected to femto cell 105. In a step 235, PPP header information is gathered. In a step 240, the original PPP associated with the device with the destination IP address is removed. In a step 245, a new PPP is created by femto cell 105, and femto cell 105 replaces the original PPP. In a step 150, data from the user is routed directly within femto cell 105 to the device with the destination IP address.

Figure 3:
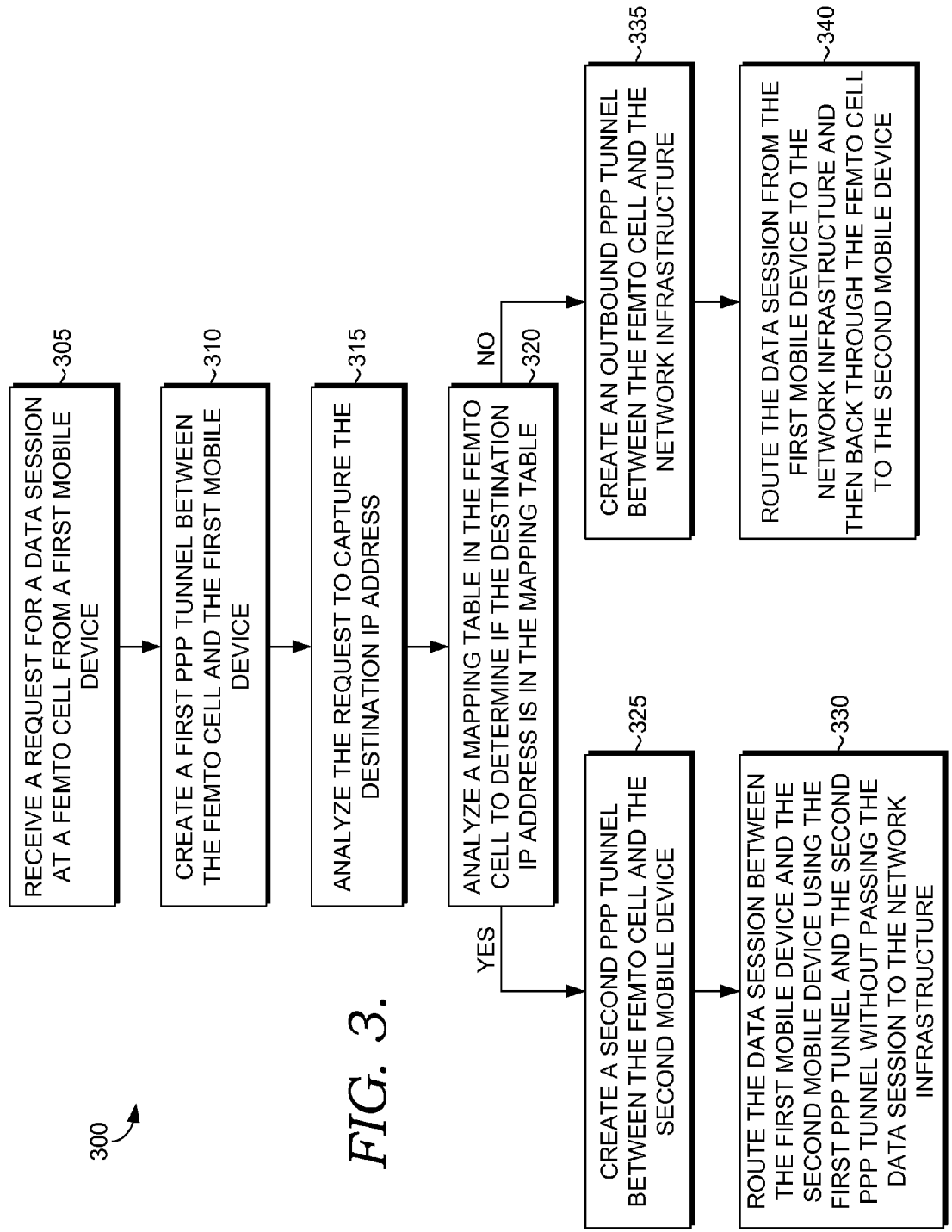
FIG. 3 illustrates a process for facilitating local communications between wireless devices at a femto cell implemented in accordance with an embodiment of the present invention.

In FIG. 3, a process for facilitating local communications between wireless devices at a femto cell is shown in a method 300. In a step 305, a request is received for a data session at femto cell 105 from mobile device 120. The request includes a source IP address associated with mobile device 120 and a destination IP address associated with mobile device 125. In a step 310, a first PPP tunnel (PPP 135*a* and PPP tunnel 130*a*) is created between femto cell 105 and mobile device 120. The first PPP tunnel is created by binding femto cell 105 and mobile device 130 together in a communication session. In a step 315, the request is analyzed to capture the destination IP address. In a step 320, mapping table 130 is analyzed in femto cell 105 to determine if the destination IP address is located in mapping table 130. If the destination IP address (IP address 130*e*) is located in mapping table 130, in a step 325, a second PPP tunnel (PPP 145 and PPP tunnel 130*b*) is created between femto cell 105 and mobile device 125. The second PPP tunnel is created by removing an original PPP tunnel (PPP 140*a*) that mobile device 125 has with femto cell 105. Then, the second PPP tunnel (PPP 145 and PPP tunnel 130*b*) is established between mobile device 125 and femto cell 105.

In a step 330, the data session is routed between mobile device 120 and mobile device 125 using PPP tunnel 130*a* and PPP tunnel 130*b* without passing the data session to the network infrastructure which includes PDSN 110 and HA 115.

In a step 335, if the destination IP address is not located in mapping table 130, an outbound PPP tunnel is created between femto cell 105 and the network infrastructure. In a step 340, the data session is routed from mobile device 120 through femto cell 105 to the network infrastructure. In many cases, the data session is routed to a second mobile device located elsewhere. However, if the second mobile device is connected to femto cell 105 but the destination IP address is not found in mapping table 130, the data session can be routed back through femto cell 105 to mobile device 125.

Figure 4:
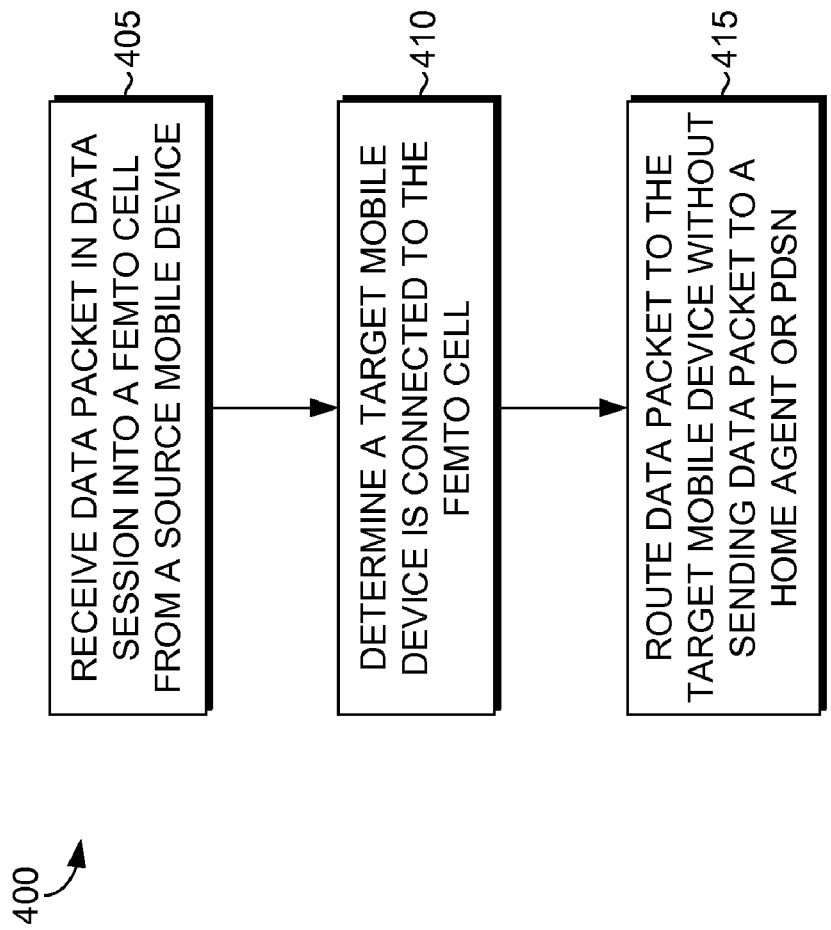
FIG. 4 illustrates a process for routing data packets to devices connected to a femto cell implemented in accordance with an embodiment of the present invention.

In FIG. 4, a process for routing data packets to devices connected to a femto cell is shown in a method 400. In a step 405, a data packet in a data session is received into femto cell 105 from a source mobile device (mobile device 120). The data packet typically includes the IP address of the source mobile device, the IP address of a target mobile device, and a payload. The data packet is analyzed in femto cell 105 to determine where the data packet should be routed. In a step 410, a determination is made that the data packet should be routed to the target mobile device (mobile device 125) that is connected to femto cell 105. This determination is made by checking for the IP address of the target mobile device in mapping table 130 in femto cell 105. Femto cell 105 encapsulates the data packet into a PPP proxy (PPP 145). In a step 415, femto cell 105 routes the data packet to the target mobile device (mobile device 125) without sending the data packet to HA 115 or PDSN 110.

Figure 5:
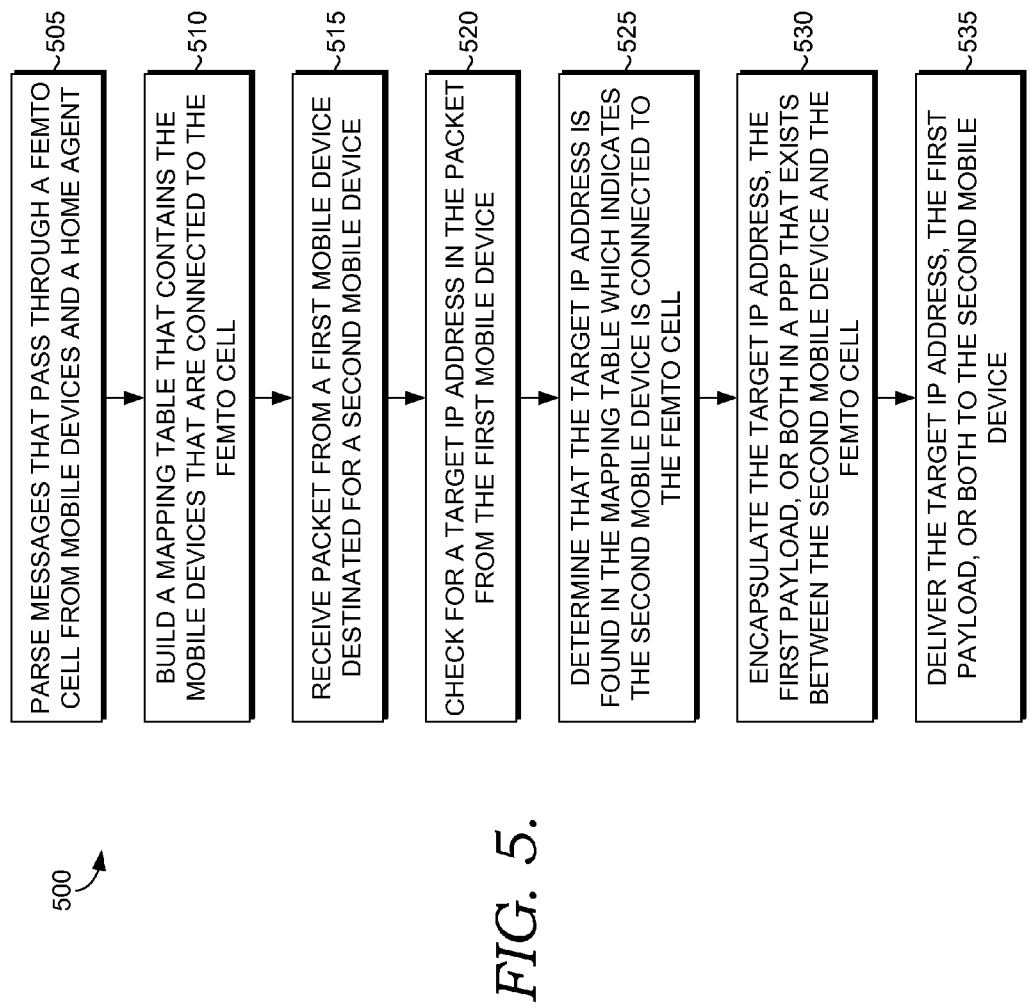
FIG. 5 illustrates a process for eliminating a need to send a data session to a home agent when two devices are connected to the same femto cell implemented in accordance with an embodiment of the present invention.

Turning now to FIG. 5, a process for eliminating a need to send a data session to a home agent when two devices are connected to the same femto cell is shown in a method 500. In a step 505, messages are parsed that pass through femto cell 105 from mobile devices 120 and 125 and HA 115. These messages can occur as signaling packets and can begin to flow once the mobile devices are turned on seeking authorization to connect to femto cell 105. In a step 510, mapping table 130 is built contains information about the mobile devices that are connected to femto cell 105. Mapping table 130 is built by adding an IP address and PPP tunnel information of a mobile device to mapping table 130.

In a step 515, a packet is received from a first mobile device (mobile device 120) destined for a second mobile device (mobile device 125). The packet includes a source IP address (IP address 130*d*) of the first mobile device (mobile device 120), a target IP address (IP address 130*e*) of the second mobile device (mobile device 125), and a first payload (payload 135*c* or payload 140*c*). At a minimum, the target IP address (IP address 130*e*) and the first payload (payload 135*c*) are encapsulated into PPP 135*a* that exists between the first mobile device (mobile device 120) and femto cell 105.

In a step 520, femto cell 150 checks for a target IP address in the packet from the first mobile device (mobile device 120). In a step 525, a determination is made that the target IP address (IP address 130*e*) is found in mapping table 130, which indicates the second mobile device (mobile device 125) is connected to femto cell 105. In a step 530, the target IP address (IP address 130*e*) and the first payload (payload 140*c*) are encapsulated into PPP 145 that exists between the second mobile device (mobile device 125) and femto cell 105. Note that the first payload is really the same throughout the delivery process. Referring to FIG. 1, the first payload is interchangeable with payload 135*c* and payload 140*c*. In a step 535, the target IP address (IP address 130*e*) and the first payload (payload 140*c*) are delivered to the second mobile device (mobile device 125).

A scenario may be shown where two people are in a residence and want to share pictures with each other. One person has a cellular phone and the other person has a PDA with phone capability. The residence has a femto cell since the two people are located in a residence that normally cannot receive wireless connectivity to a macro wireless network. The femto cell is connected through a digital subscriber line (DSL) or cable broadband network which enables the two people to use their cellular phone and PDA in the residence for both voice and data services. The first person attempts to send a set of photographs that are located on the cellular phone to the second person who has the PDA. The first person follows normal procedures and the set of photographs are delivered to the second person at their PDA. However, unbeknownst to either person, the femto cell receives the data from the first person's cellular phone and directly routes the data containing the set of photographs to the second person's PDA. The actions of the femto cell creates efficiencies by not creating outbound and inbound data connections with the PDSN and HA. By not creating these additional connections, less resources and bandwidth capacity are used, making the network or network infrastructure more efficient.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for facilitating local communications between wireless devices at a femto cell without passing communication to a network infrastructure, comprising:
   receiving a request for a data session at the femto cell from a first mobile device, wherein receiving the request comprises receiving a source internet protocol (IP) address associated with the first mobile device and a destination IP address associated with a second mobile device;
   creating a first point-to-point protocol (PPP) tunnel between the femto cell and the first mobile device;
   wherein creating the first PPP tunnel comprises binding the femto cell and the first mobile device together in a communication session;
   analyzing the request to capture the destination IP address;
   analyzing a mapping table in the femto cell to determine if the destination IP address is in the mapping table;
   if the destination IP address is in the mapping table, creating a second PPP tunnel between the femto cell and the second mobile device;
   wherein creating the second PPP tunnel comprises removing an original PPP tunnel that the second mobile device has with the femto cell and establishing the second PPP tunnel between the second mobile device and the femto cell and routing the data session between the first mobile device and the second mobile device using the first PPP tunnel and the second PPP tunnel without passing the data session to the network infrastructure wherein the network infrastructure includes at least one of a home agent and a packet data serving node (PDSN); and
   if the destination IP address is not in the mapping table, but the second mobile device is connected to the femto cell, creating an outbound PPP tunnel between the femto cell and the network infrastructure and routing the data session from the first mobile device to the network infrastructure and then back through the femto cell to the second mobile device.

2. The method of claim 1, further comprising creating the mapping table in the femto cell by monitoring traffic between the femto cell and the network infrastructure, adding an entry in the mapping table for each mobile device that connects to the femto cell, and removing the entry from the mapping table for each mobile device that is not connected to the femto cell.

3. The method of claim 2, further comprising receiving the entry to populate the mapping table from the at least one of the home agent and the PDSN.

4. The method of claim 2, further comprising receiving the entry to populate the mapping table from each mobile device.

5. A method for routing data packets to devices connected to a femto cell, comprising:
   receiving a data packet in a data session into a femto cell from a source mobile device, wherein receiving the data packet comprises receiving an internet protocol (IP) address of the source mobile device and an IP address of the target mobile device in a header of the data packet and receiving a payload in a body of the data packet;
   wherein the data session comprises binding the femto cell and the first mobile device together in a first PPP tunnel communication session;
   determining a target mobile device is connected to the femto cell, wherein determining the target mobile device is connected to the femto cell comprises checking for the IP address of the target mobile device in a mapping table in the femto cell and determining that the IP address of the target mobile device is found in the mapping table;

routing the data packet to the target mobile device without sending the data packet to a home agent or a packet data serving node (PDSN), wherein routing the data packet to the target mobile device comprises encapsulating the data packet into a point-to-point protocol (PPP) proxy;

wherein encapsulating the data packet into a point-to-point (PPP) proxy comprises removing an original PPP tunnel that the target mobile device has with the femto cell and establishing second PPP tunnel between the target mobile device and the femto cell; and determining the target mobile device is connected to the femto cell, wherein determining the target mobile device is connected to the femto cell comprises checking for the IP address of the target mobile device in a mapping table in the femto cell and determining that the IP address of the target mobile device is not found in the mapping table, creating an outbound PPP tunnel between the femto cell and the network infrastructure and routing the data session from the source mobile device to the network infrastructure and then back through the femto cell to the target mobile device.

6. A method for eliminating a need to send a data session to a network infrastructure when two devices are connected to same femto cell comprising:

parsing messages that pass through the femto cell from mobile devices and the network infrastructure wherein the network infrastructure includes at least a home agent and a packet data serving node (PDSN);

building a mapping table in the femto cell that contains information about the mobile devices that are connected to the femto cell wherein building the mapping table comprises adding an internet protocol (IP) address and a point-to-point protocol (PPP) tunnel information of a mobile device to the mapping table;

receiving a packet in the femto cell from a first mobile device destined for a second mobile device wherein the packet includes a source IP address of the first mobile device, a target IP address of the second mobile device, and a first payload, and wherein at least the target IP address and the first payload are encapsulated into a first PPP tunnel between the first mobile device and the femto cell, wherein the first PPP tunnel comprises binding the femto cell and the first mobile device together in a communication session;

checking for the target IP address in the received packet from the first mobile device;

determining that the target IP address of the second mobile device is found in the mapping table which indicates the second mobile device is connected to the femto cell;

encapsulating the at least the target IP address and the first payload into a second PPP tunnel between the second mobile device and the femto cell, wherein the second PPP tunnel comprises removing an original PPP tunnel that the second mobile device has with the femto cell and establishing the second PPP tunnel between the second mobile device and the femto cell;

delivering the at least the target IP address and the first payload to the second mobile device without sending the data packet to the home agent or the packet data serving node (PDSN); and determining that the target IP address of the second mobile device is not found in the mapping table, but the second mobile device is connected to the femto cell, creating an outbound PPP tunnel between the femto cell and the network infrastructure and routing the data session from the first mobile device to the network infrastructure and then back through the femto cell to the second mobile device.

7. The method of claim 6, further comprising allocating a memory in the femto cell and storing the mapping table in the memory.

8. The method of claim 7, wherein the second PPP binds the femto cell and the second mobile device into another communication session.

9. The method of claim 7, further comprising receiving the IP address of the mobile device to populate the mapping table from the home agent.

10. The method of claim 7, further comprising receiving the IP address of the mobile device to populate the mapping table from the mobile device.

11. The method of claim 7, further comprising removing the target IP address from the mapping table which indicates the second mobile device is not connected to the femto cell.

\* \* \* \* \*